United States Patent [19]

Miyauchi et al.

[11] Patent Number: 4,875,141

[45] Date of Patent: Oct. 17, 1989

[54] HEADLIGHT FOR VEHICLE

[75] Inventors: Shizuya Miyauchi; Kiyoshi Wada, both of Shimizu, Japan

[73] Assignee: Koito Seisakusho Co., Ltd., Shizuoka, Japan

[21] Appl. No.: 138,544

[22] Filed: Dec. 21, 1987

[30] Foreign Application Priority Data

Dec. 20, 1986 [JP] Japan .................. 61-304632

[51] Int. Cl.4 .......................... B60Q 1/04
[52] U.S. Cl. .......................... 362/61; 362/72; 362/277; 362/324; 362/319; 362/284; 362/71
[58] Field of Search ............... 362/61, 80, 66, 69, 362/72, 324, 277, 319, 322, 282, 284

[56] References Cited

U.S. PATENT DOCUMENTS 1,678,170  7/1928  Tjaden ...................... 362/324
2,015,935 10/1935  Herring .................... 362/284
4,768,135  8/1988  Kretschmer et al. ..... 362/277

Primary Examiner—Ira S. Lazarus
Assistant Examiner—Sue Hagarman
Attorney, Agent, or Firm—Sughrue, Mion, Zinn, Macpeak & Seas

[57] ABSTRACT

A headlight for use in a vehicle and comprising a lamp body a reflective mirror mounted in the lamp body and having a front opening, a bulb mounted in the reflective mirror and acting as the light source of the headlight, a douser plate mounted on the lamp body at the location between the front opening of the mirror and the bulb and intercepting a part of the light emitted from the bulb. The douser plate is supported on the lamp body such that the douser plate can incline transversely with respect to the lamp body, and driving device is provided on the lamp body for transversely inclining the douser plate.

8 Claims, 11 Drawing Sheets

HEADLIGHT FOR VEHICLE

BACKGROUND OF THE INVENTION

1. A. Field of the Invention

The present invention relates to a headlight for use in a vehicle such as an automobile, a motor cycle or the like and, particularly to a headlight of the type wherein light control members defining the direction of the light distribution can be inclined relative to the vehicle body, and there are provided driving means for inclining the light control members thereby controlling the direction of the light distribution. It is not required to move a reflective mirror or a light control lens in changing the direction of the light distribution. Thus, the size and the weight of the headlight can be minimized.

2. B. Prior Art

A headlight for use in a vehicle such as an automobile is required to have a good light distribution in the forward direction of the body of the vehicle, however, usual headlights are fixed to the vehicle body and the direction of the light distribution is determined by the facing of the vehicle body, thus, when the vehicle travels along a curved lane the headlight may not illuminate the traveling direction. Further, in case of a two wheeled vehicle, the beam is inclined by the angle of inclination of a vehicle body in the transverse direction that is to the left or right with respect to the horizontal plane and the traveling direction. The driving safety is impaired, and the drivers of opposing cars may sometimes suffer glare.

It has been proposed to adjust the light distribution by detecting the inclination of the body of the vehicle and changing the direction of members determining the inclination of the light distribution. Japanese patent publication No. 56-18430 shows one example, wherein a reflective mirror, a control lens and the like of a headlight unit are supported in a casing to rotate around the optical axis and, when the body of the vehicle inclines, the mirror, lens and the like are rotated by an electric motor in response to the inclination of a gravity member which inclines against the inclination of the vehicle body thereby adjusting the light distribution.

The prior art headlight described as above has been formed to move integrally the reflecting mirror, the lens and the bulb, thus, the size and the weight of the movable portion is increased, and it is required to use a complicated supporting structure such that the reflective mirror is supported by a plurality of rollers on the casing of the headlight.

Thus, the dimension and the weight of the headlight device increase, and the driving force also increases. Further, it is required to increase the driving force of the movable portion. The size and weight of the movable portion and the undesired movement of the movable portion will cause the difficulty in the locational adjustment and occasionally an inadequate and unstable light distribution which may bother one's driving.

SUMMARY OF THE INVENTION

There has been proposed a headlight for use in a vehicle of the type wherein a portion of the light is intercepted by a douser plate which is located on the side of an open front end of a reflective mirror thereby forming a predetermined light distribution.

In consideration of the fact that the direction of the light distribution in the transverse directions can be changed by changing the position of the douser plate relative to the reflective mirror, according to the invention, there is provided a headlight of aforesaid type wherein the douser plate is supported on a lamp body to incline to the left or right, and there is provided on the lamp body driving means for inclining the douser plate.

Thus, the headlight of the invention enables to change the direction of the light distribution without moving the reflective mirror, the lens controlling the light and the like, and by inclining only the douser plate. The douser plate constitutes the single movable member in adjusting the light distribution, thereby simplifying the construction of the headlight, reducing the dimension and the weight, and it is possible to reduce the driving force and the size of the driving source. Further, since the size and weight of the douser plate are relatively small, the adjusting movement is smooth and accurate.

BRIEF DESCRIPTION OF THE DRAWINGS

FIG. 1 is a longitudinal sectional view:

FIG. 2 is a section view taken along line I—I in FIG. 1;

FIG. 3 is a partially broken enlarged perspective view omitting a lamp body and a cover lens;

FIG. 4 is a partial perspective exploded view;

FIG. 5 is an explanatory view showing the locus of the light emitted from a light source;

FIG. 6 is a view showing the light distribution;

FIG. 7 is a view showing the principle;

FIG. 8 is a longitudinal sectional view;

FIG. 9 is a cross-section taken along line X—X in FIG. 8;

FIG. 10 is a partially broken perspective exploded view;

DESCRIPTION OF THE PREFERRED EMBODIMENTS

Figure 1:
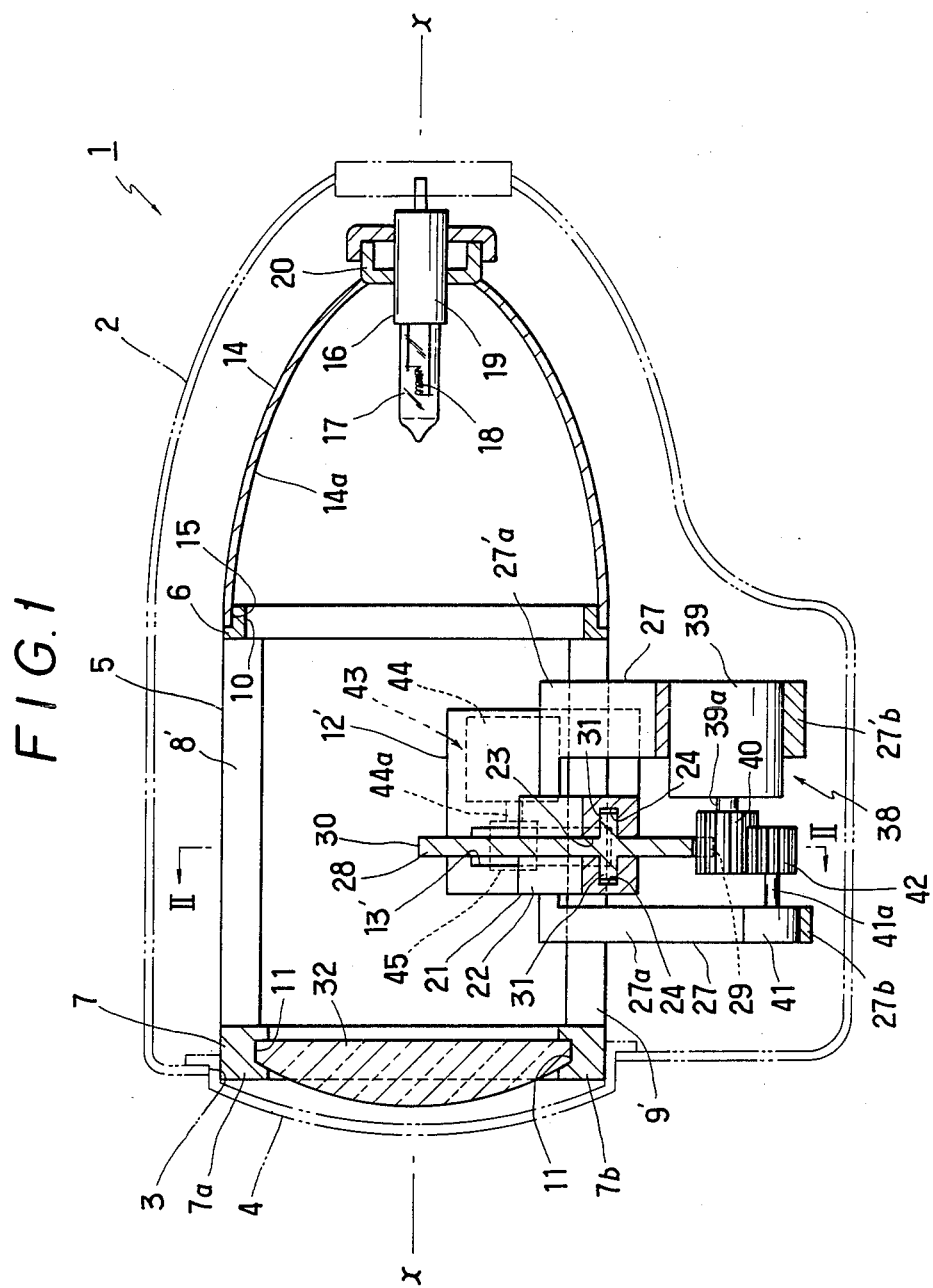
FIG. 1 through FIG. 6 show one example of a headlight of a vehicle according to the present invention.

Details of the headlight according to the invention will now be explained in conjunction with the drawings exemplifying preferred embodiments of the invention.

It will be noted that the embodiments shown in the drawings relate to a headlight for use in a two wheeled motor vehicle, and enable the adjustment of the distribution of the light to the left or right and also in the longitudinal directions by inclining the douser plate when the body of the vehicle is inclined either transversely or longitudinally directions.

a. Lamp Body, Cover Lens [FIG. 1]

Figure 2:
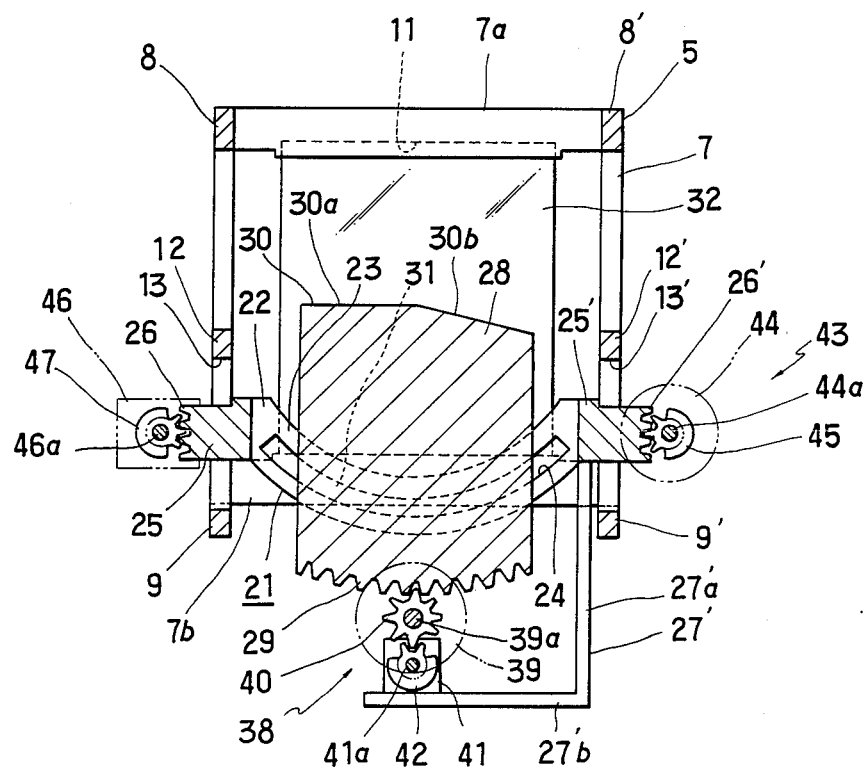
Figure 3:
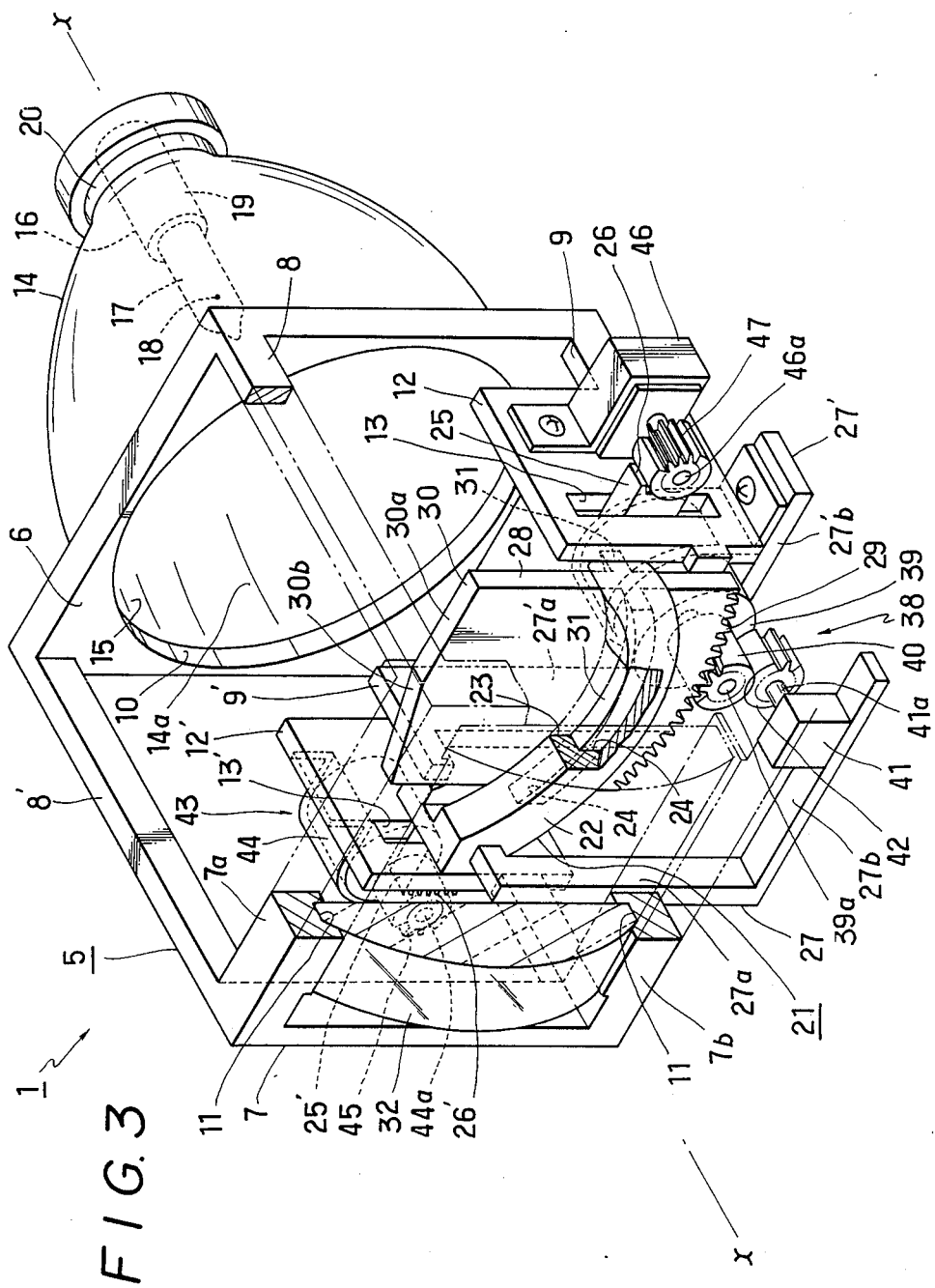
Figure 4:
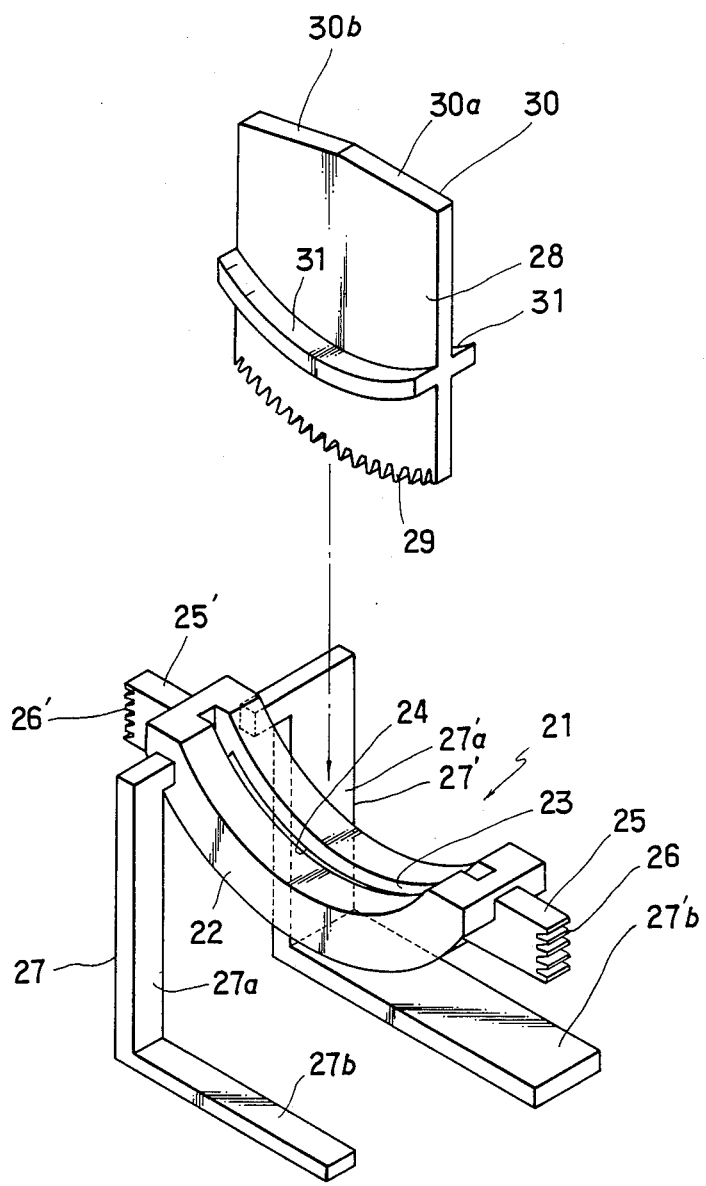

Shown at 1 in FIG. 1 is a headlight according to the invention, and comprises a lamp body 2, which is mounted on a supporting arm (not shown) projecting forward from a forward end portion of a vehicle body and, has in the forward end a generally rectangular opening 3 to mount therein a cover lens 4.

b. Frame, Supporting Plate [FIG. 1–FIG. 3]

A frame 5 includes a reflective mirror mounting plate 6 of a generally rectangular configuration as viewed in the longitudinal direction of the vehicle, a lens mounting plate 7 of tie configuration nearly equal to the mirror mounting plate 6 and being located forward of the plate 6, and four support members 8, 8' and 9, 9' connecting corresponding corner portions of the mirror mounting plate 6 and the lens mounting place 7. There is formed in the mirror mounting plate 6 and opening 10 of a generally circular shape as viewed from forward, and in upper and lower transversely extending portions 7a and 7b of the lens mounting plate 7 transversely extending grooves 11 and 11.

Generally square shaped supporting plates 12 and 12' as viewed in sidewise directions are respectively formed on portions excluding the front and rear end portions of the lower support members 9 and 9' with the major portions of the plates 12 and 12' being located upward of the support members 9 and 9', and the lower end portions thereof projecting downward from he members 9 and 9'. Vertically extending guide slots 13 and 13' are formed respectively in the front end portions of the plates 12 and 12'. The frame 5 is secured in the lamp body 2 by suitable fixing means (not shown) with the lens mounting plate 7 being positioned adjacent to the rear end of the cover lens 4.

c. Reflecting Mirror, Bulb [FIG. 1, FIG. 3, FIG. 5]

Shown at 14 is a reflecting mirror having a reflecting surface 14a of the shape of a ellipsoid revolution. Namely, the surface 14a is formed by rotating an ellipse around the apsidal line thereof and cutting generally along the central plane. Thus, the surface 14a acts to reflect the light emitted from a light source located on one focus $F_1$ (referred hereinafter as a first focus) of two focusi $F_2$ and $F_3$ of the ellipse and of the focus located in the mirror 14 to converge said light on the other focus $F_2$ (referred hereinafter as a second focus).

The mirror 14 is mounted on the rear surface of the reflective mirror mounting plate 6 with the open end portion 15 aligning with the opening 10 formed in the mounting plate 6.

A bulb 16 is mounted on a bulb mounting portion 20 provided on the rear end of the reflective mirror 14. A filament 18 in a glass bulb 17 of the bulb 18 is located on the first focus $F_1$ of the mirror 14, and a base 19 of the bulb 16 is fitted in the bulb mounting portion 20.

d. Elevator Member [FIG. 1–FIG. 4]

An elevator member 21 is vertically movably supported on the frame 5, and supports thereon a douser plate 28 which will be explained hereinafter.

The elevator member 21 includes a main portion 22 of a generally downwards projecting arcuate configuration as viewed in the longitudinal direction (FIG. 2) and having a vertically extending slit 23. Arcuate guide grooves 24 and 24 are formed in longitudinally opposing surfaces of the slit 23. The main portion 22 has on transversely opposite ends projecting portions 25 and 25' having respectively rack teeth 26 and 26' which extend in the vertical directions.

Arms 27 and 27' are connected to the main portion 22 of the elevator member 21 for supporting a motor 39, an inclination detector 41 and the like which will be explained hereinafter. The arms 27 and 27' are of generally L-shaped as viewed rearward, and the upper end portions of vertically extending portions 27a and 27a' are connected to the right end portion of the main portion 22. The left ends of horizontally extending portions 27b and 27b' of the arms 27 and 27' are on the positions corresponding to the transversely central portion of the arcuate main portion 22.

The elevator 21 is vertically movable relative to the frame 5 with the projecting portions 25 and 25' engaging slidably with the guide slots 13 and 13' of supporting plates 12 and 12' of the frame 5.

The portions having rack teeth 26 and 26' of the projecting portions 25 and 25' project outward of the guide slots 13 and 13'.

e. Douser Plate [FIG. 1–FIG. 5]

The douser plate 28 acts to intercept a part of light emitted from the filament 18 of the bulb 16 and reflected by the reflective surface 14a of the mirror 14.

The douser plate 28 is of a generally rectangular form and has downwards projecting arcuate rack teeth 29 on the lower end, an upper edge 30 consisting of a downward inclined right half portion 30b and a horizontally extending left half portion 30a.

The douser plate 28 further has on slightly downward locations with respect to the vertically central portion of the front and rear surfaces arcuate guided ridges or projections 31 and 31. The center of the curvature of guided projections 31 and 31 lies on the center of the upper edge 30 or the intersection between the left and the right half portions 30a and 30b. The curvature of the guided projections 31 and 31 of the douser plate 28 corresponds to the curvature of the guide grooves 24 and 24 in the elevator member 21. The projections 31 and 31 are slidably received respectively in the guide grooves 24 and 24 whereby the douser plate 28 is mounted on the elevator member 21 and can incline in the left and right directions, further, the douser plate 28 can move in the vertical directions together with the elevator member 21.

The douse plate 28 shown in FIG. 1 through FIG. 3, FIG. 5 and FIG. 6 is on the position not inclined in left and right directions and the central portion of the upper edge 30 being on the optical axis of the reflective mirror 14 (referred hereinafter as initial position). The central portion of the upper edge 30 of the douser plate 28 is located on or slightly forward of the second focus $F_2$ of the mirror 14 when the douser plate 28 is on the initial position.

f. Projector Lens [FIG. 1–FIG. 3, FIG. 5]

Figure 5:
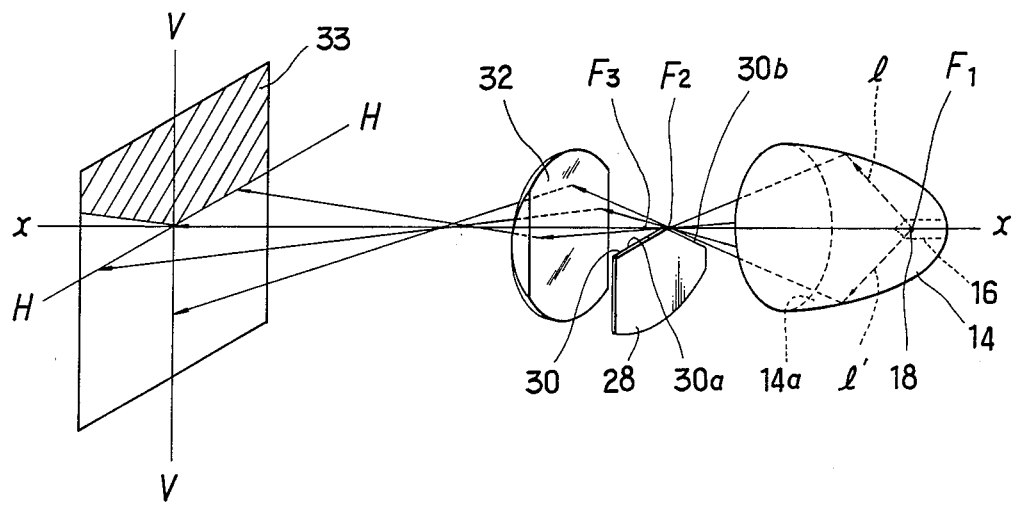

A projector lens 32 of a convex lens is mounted on the frame 5 with the upper and lower edges of the lens 32 engaging with the grooves 11 and 11 formed in the upper and lower transversely extending portions 7a and 7b of the frame 5. A focus $F_3$ of the projector lens on the side of the mirror 14 is located on the optical axis x—x of the mirror 14 and slightly forward of the douser plate 28 as shown in FIG. 5.

g. Locus and Distribution of Light [FIG. 5, FIG. 6]

The light emitted from the filament 18 of the bulb 16 toward the reflective surface 14a takes the following locus and emitted forward of the lamp body 2.

The light 1 emitted from the filament 18 toward the upper half portion of the reflective surface 14a of the mirror 14 converges on the second focus $F_2$ and, then, is directed downward. Thus, the light 1 is intercepted by the douser plate 28 and does not reach the lens 32.

The light 1' emitted from the filament 18 toward the lower half portion of the reflective surface 14a of the mirror 14 converges on the second focus $F_2$ and, then, is directed upward. Thus, the light 1' is not intercepted by the douser plate 28 and passes through the lens 32.

The focus $F_3$ of the projector lens on the side of the mirror 14 is located on the optical axis x—x of the mirror 14 and slightly forward of the douser plate 28 as described heretofore, thus, the douser plate 28 makes a real image on a screen 33 located forward of the lens 32 with the upside down and transversely reversed. The upper edge 30 of the douser plate 28 makes a line consisting of a horizontal right half portion and upward inclining left half portion.

Figure 6:
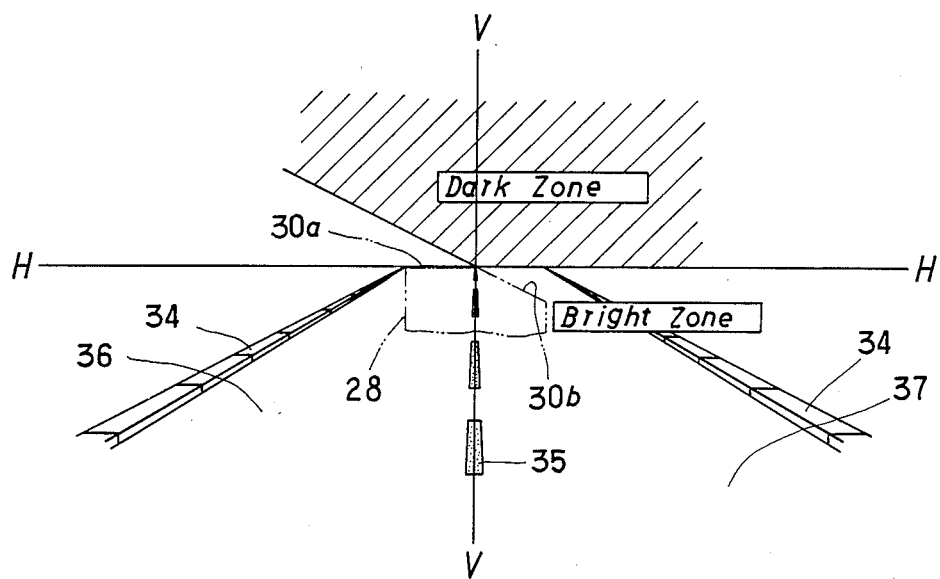

As shown in FIG. 6, when the douser plate 28 is on the initial position, the light distribution includes a dark zone corresponding the real image of the douser plate 28.

Figure 12:
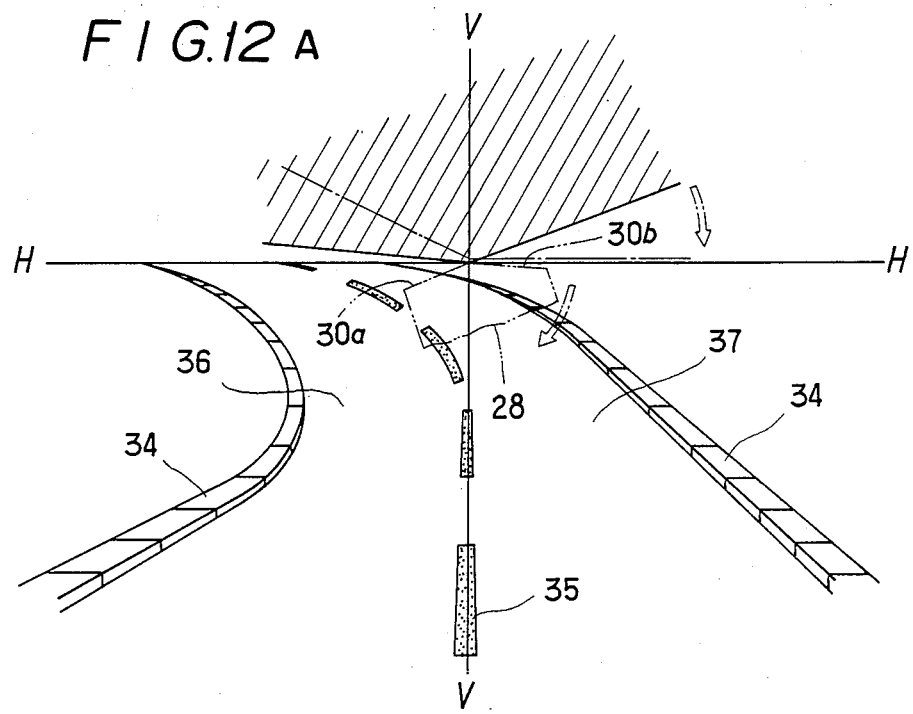
FIG. 12A through FIG. 12D are views showing the light distribution for explaining the adjusting operation.
Figure 12:
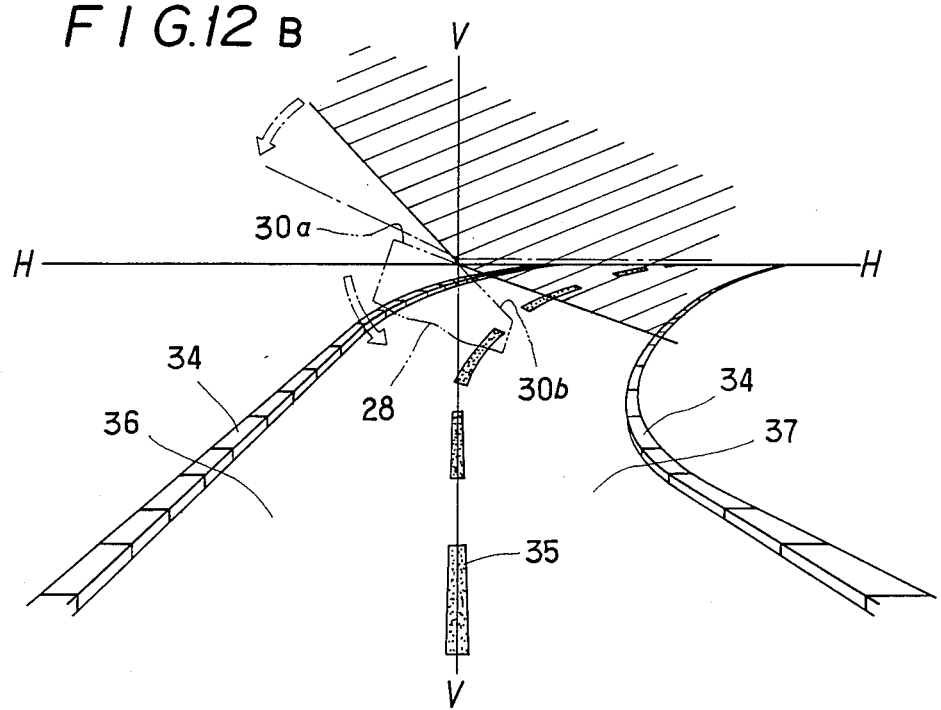
Figure 12:
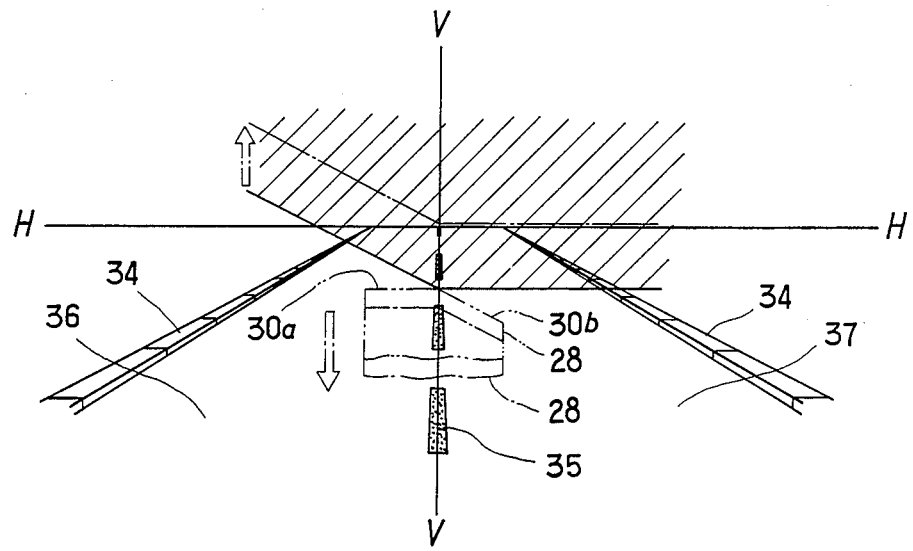
Figure 12:
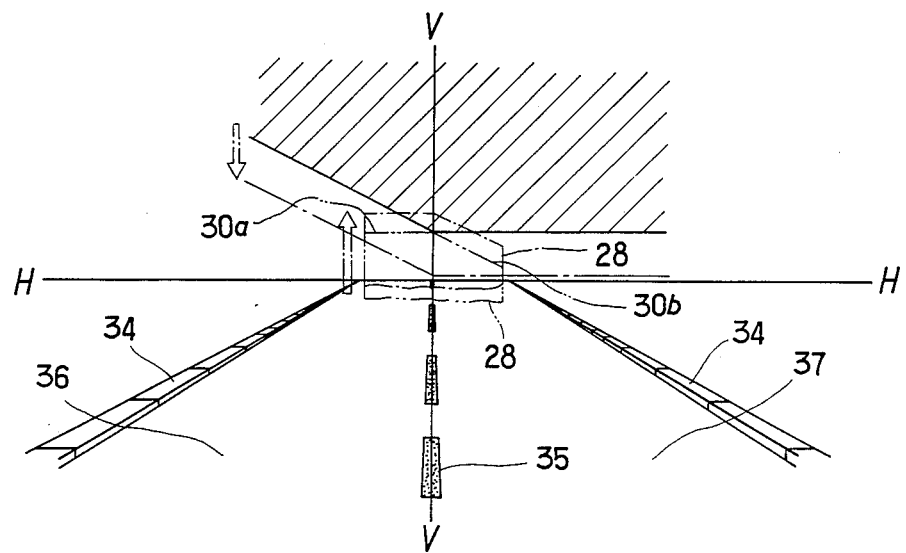
Figure 13:
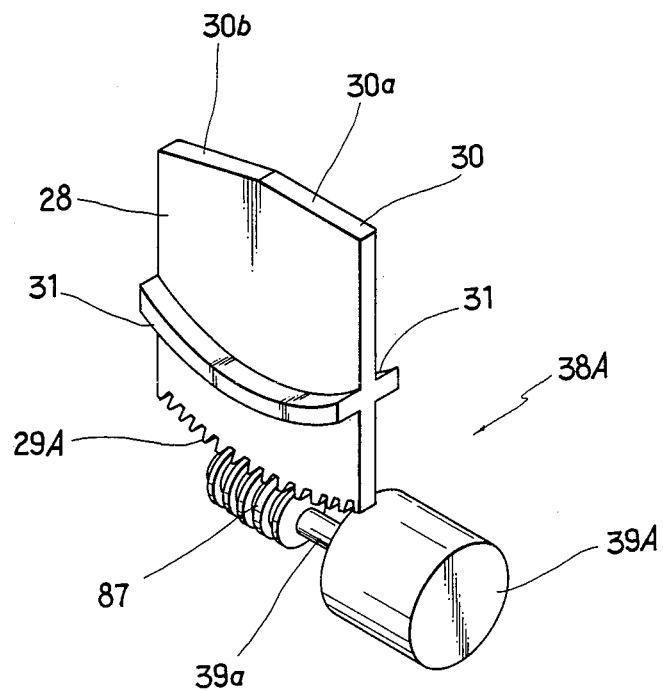
FIG. 13 is a perspective view of a modified form of the driving portion for inclining the douser plate.

Shown at 34 and 34 are shoulders of road in FIG. 6, FIG. 12 and FIG. 13, at 35 is the center line, at 36 a travelling lane and at 37 is an opposing lane.

h. First Driving Portion [FIG. 1–FIG. 3]

A first driving portion 38 acts to incline the douser plate 28 in the left and right directions and to detect the amount of the inclination.

h-1 Constitution

A first motor 39 is supported on the tip end portion of the lower portion 27'b of the rear arm 27' of the elevator member 21 with a rotor shaft 39a of the motor 39 extending in the longitudinal directions, and has a gear 40 fixed to the shaft 39a to engage with the rack teeth 29 of the douser plate 28.

An inclination detector 41 is supported on the tip end portion of the lower portion 27b of the front arm 27 of the elevator member 21 with a rotor shaft 41a of the detector 41 extending in the longitudinal directions, and has a gear 42 fixed to the shaft 41a to engage with a gear 40 which is fixed to the rotor shaft 39a of the first motor 39.

The inclination detector 41 comprises a potentiometer with the resistance value changing in response to the rotation of the rotor shaft 41a of the detector.

h-2 Operation, Movement of Light Distribution

When the first motor 39 rotates, the gear 40 of the motor 39 moves the rack 29 of the douser plate 28 in the transverse directions, thus, the guided projections or ridges 31 and 31 slidingly move along the guide grooves 24 and 24 in the elevator member 21. The douser plate 28 inclines around the center of the curvature of arcuate guide grooves 24 and 24 which is located on the central portion of the upper edge 30 of the douser plate. The douser plate 28 inclines around the optical axis x—x, and the light distribution shown in FIG. 6 inclines around the optical axis x—x.

Further, upon rotation of the first motor 39, the gear 42 fixed to the rotor shaft 41a of the inclination detector 41 is rotated by an amount corresponding to the inclination of the douser plate 28, and the terminal voltage of the detector 41 changes. Therefore, it is possible to detect the angle of the inclination of the douser plate 28 by detecting the terminal voltage.

i. Second Diving Portion [FIG. 1–FIG. 3]

A second driving portion 43 moves the elevator member 21 in the vertical directions and detects the amount of the movement.

i-1 Constitution

A second motor 44 is supported on the rear portion of the right side surface of the right side supporting plate 12 with a rotor shaft 44a of the motor 44 extending in the longitudinal directions, and has a gear 45 fixed to the shaft 44a to engage with the rack teeth 26' of the projecting portion 25' which projects right side of the main portion 22 of the elevator member 21.

A displacement detector 46 is mounted on the rear portion of the rear side surface of the left side supporting plate 12, and a gear 47 secured to the tip end portion of a rotor shaft 46a of the detector 46 engages with the rack teeth 26 formed on the left side projecting portion 25 of the elevator member 21.

The displacement detector 46 comprises a potentiometer the resistance value of which changes in response to the rotation of the motor shaft.

i-2 Operation, Movement of Light Distribution

When the second motor 44 is rotated, the gear 45 of the motor 44 moves the right side rack 26' of the elevator 21 in the vertical directions, thus, the elevator member 21 together with the douser plate 28 displaces integrally in the vertical directions. The position of the upper edge 30 of the douser plate 28 displaces in the vertical directions relative to the optical axis x—x. The light distribution shown in FIG. 6 displaces in the direction opposite to the displacement of the douser plate 28.

Further, the displacement of the elevator member 21 in the vertical directions causes the gear 47 fixed on the rotor shaft 46a of the displacement detector 46 to rotate by an amount corresponding to the displacement of the elevator member 21 or the displacement of the douser plate 28 in the vertical directions, and the terminal voltage of the detector 46 changes. Therefore, it is possible to detect the amount of the displacement of the douser plate 28 by detecting the terminal voltage.

j. Inclination Detector of Vehicle [FIG. 7–FIG. 10]

Figure 7:
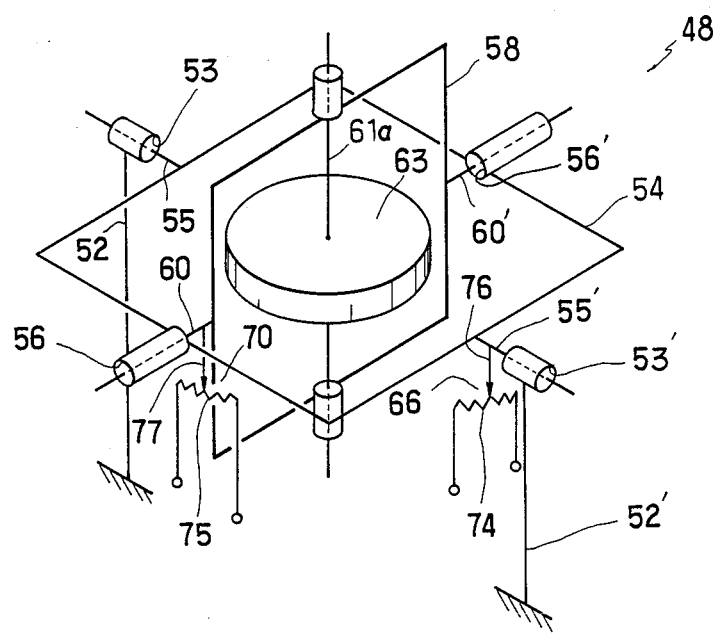
FIG. 7 through FIG. 10 show a vehicle body inclination detector.
Figure 8:
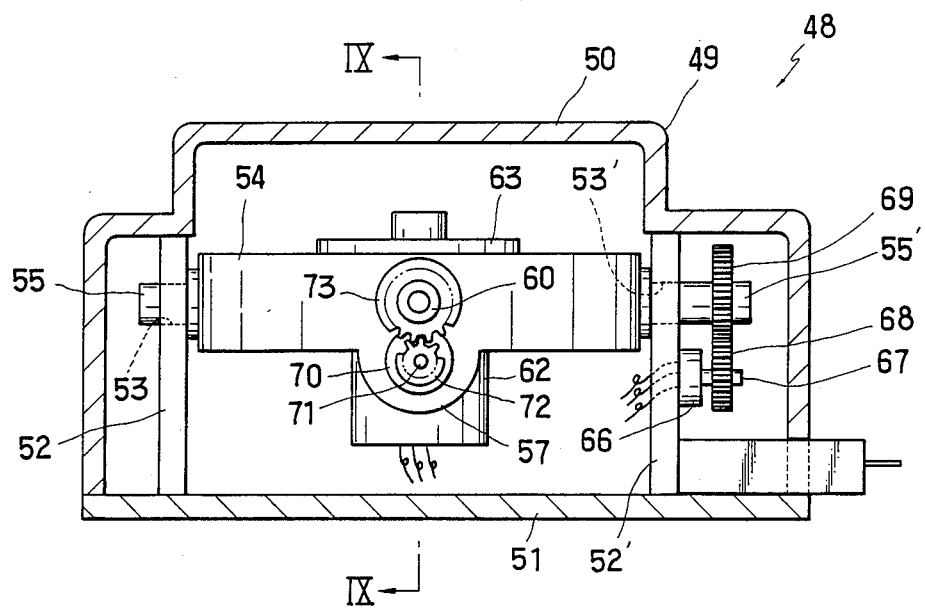
Figure 9:
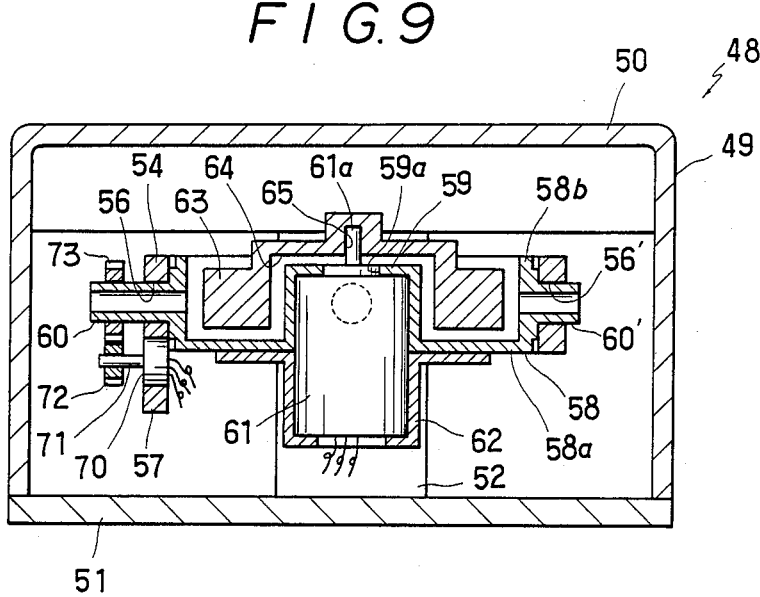
Figure 10:
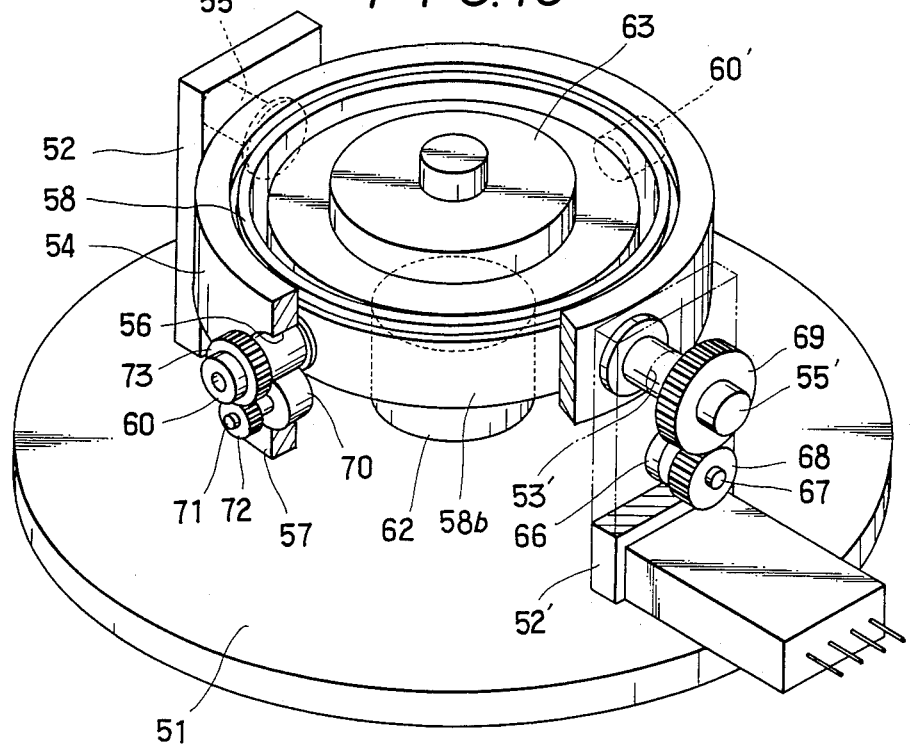

FIG. 7 through FIG. 10 show a vehicle body inclination detector 48, and FIG. 7 shows operational principle schematically. In these drawings, the same reference numerals are applied to corresponding parts.

j-1 Casing [FIG. 8–FIG. 10]

The vehicle body inclination detector 48 comprises a casing 49 mounted on generally central portion of the vehicle body. The casing 49 consists of a cover member 50 and a base plate 51 on which the cover member 50 is mounted. A pair of supporting walls 52 and 52' are formed on the base plate 51 to project therefrom in parallel and opposing condition, and supporting bores 53 and 53' are formed in the supporting walls 52 and 52' to extend in the longitudinal directions and in the upper portions of the supporting walls 52 and 52'.

j-2 Gimbals [FIG. 7–FIG. 10]

An outer gimbal 54 is of an annular shape having a considerable width in the vertical direction and, has horizontally outwards projecting shafts 55 and 55' along the longitudinal directions and supporting bores 56 and 56' along the transverse axis. Further, a downward projecting portion 57 is formed downward of the left side supporting bore 56.

The outer gimbal 54 is supported by supporting bores 53 and 53' formed respectively in the supporting walls 52 and 52' and rotatably receiving the shafts 55 and 55' of the outer gimbal 54 respectively.

An inner gimbal 58 is rotatably supported on the outer gimbal 54. The inner gimbal 58 includes a bottom plate 58a having the diameter slightly smaller than the inner diameter of the outer gimbal 54, and an outer peripheral wall 58b vertically extending integrally from the outer periphery of the bottom plate 58a. Further, a generally tubular projection 59 having a closed upper end and an open bottom end is formed in the central portion of the bottom plate 58a. The inner gimbal 58 has outwardly projecting shafts 60 and 60' along the transversely extending axis. The inner gimbal 58 is supported on the outer gimbal 54 through the rotatable engagement between the shafts 60 and 60' and the supporting bores 56 and 56' of the outer gimbal 54.

j-3 Motor, Rotor [FIG. 7–FIG. 10]

A motor 61 is mounted on the inner gimbal 58 with the upper half portion of the motor 61 being fitted in the tubular projection 59 of the inner gimbal 58 and the lower half portion being fitted in a motor mounting member 62 of generally inverted hat shaped configuration and secured to the lower surface of the bottom plate 58a of the inner gimbal 58. A rotor shaft 61a of the motor 61 extends upward through an opening 59a in the upper end of the tubular projection 59.

A rotor 63 is rotatably mounted on the inner gimbal 58 and, has the outer diameter slightly smaller than the inner diameter of the outer peripheral wall 58b of the inner gimbal. A relatively large recess 64 is formed in the central portion of the lower surface of the rotor 63 to loosely fit the tubular projection 59 of the inner gimbal 58. A bore 65 is formed in the central portion of the recess 64 to forcibly engage with the rotor shaft 61a of the motor 61. Thus, the rotor 63 is mounted on the inner gimbal 58 through the motor 61 which is drivingly connected to the rotor 63.

As described heretofore, the inner gimbal 58 can incline in longitudinal and transverse directions with respect to the vehicle body, and the motor 61 driving the rotor 63 is secured to the inner gimbal 58, thus, the centrifugal force due to the rotation of the rotor 63 acts to maintain the rotor shaft 61a in the direction of the gravity force or in the vertical directions. The attitude of the inner gimbal 58 is, accordingly, maintained horizontally irrespective of the inclination of the vehicle body.

j-4 Protentiometer [FIG. 7–FIG. 10]

A first potentiometer 66 is mounted on the supporting wall 52' which is secured to the base plate 51 of the casing 49, and has a gear 68 secured to the tip end of a rotor shaft 67 of the potentiometer 66 for engaging with a gear 69 which is connected to the distal end of the shaft 55' of the outer gimbal 54 projecting out of the supporting opening 53' in the supporting wall 52'.

A second potentiometer 70 is mounted on the downward projecting portion 57 of the outer gimbal 54, and a gear 72 is secured to a rotor shaft 71 of the potentiometer 70 to engage with a gear 73 which is secured to the distal end portion of the shaft 60 of the inner gimbal 58 projecting out of the supporting bore 56 of the outer gimbal 58.

The potentiometers 66 and 70 have resistances 74 and 75 (FIG. 7) respectively which slidingly contact with contact points 76 and 77 (FIG. 7) provided respectively on the rotor shafts 67 and 71.

j-5 Operation

The inclination of the vehicle body is detected by the vehicle body inclination detector 48 as follows.

The rotor 63 is maintained to rotate so that the inner gimbal 58 keeps the horizontal attitude. When the body of the vehicle inclines longitudinally or when the vehicle takes the front up or the front down attitude, the outer gimbal 54 inclines longitudinally whereby the gear 73 secured to the shaft 60 of the inner gimbal 58 rotates relative to the outer gimbal 54, and the gear 72 secured to the rotor shaft 71 of the second potentiometer 70 is rotated. The point of contact between the resistance 75 and the contact point 77 on the rotor shaft 71 of the second potentiometer 70 changes and the terminal voltage of the potentiometer 70 changes thereby. Thus, it is possible to detect the direction and the angle of inclination of the vehicle body in the longitudinal directions by detecting the terminal voltage of the second potentiometer 70.

When the body of the vehicle inclines in a transverse direction, that is, when it inclines leftward or rightward, the outer gimbal 54 is also maintained in the horizontal attitude, thus, the gear 69 secured to the shaft 55' of the outer gimbal 54 rotates relative to the casing 49, and the gear 68 secured to the rotor shaft 67 of the first potentiometer 66 is rotated by the gear 69. The point of contact between the resistance 74 and the contact point 76 on the rotor shaft 67 of the first potentiometer 66 changes and the terminal voltage of the potentiometer 66 changes thereby. Thus, it is possible to detect the direction and the angle of inclination of the vehicle body in either transverse direction by detecting the terminal voltage of the first potentiometer 66.

When the vehicle inclines in both the longitudinal and transverse directions, the direction and the angle of inclination can be detected by the first and second potentiometers 66 and 70 simultaneously.

k. Control Circuit [FIG. 11]

Figure 11:
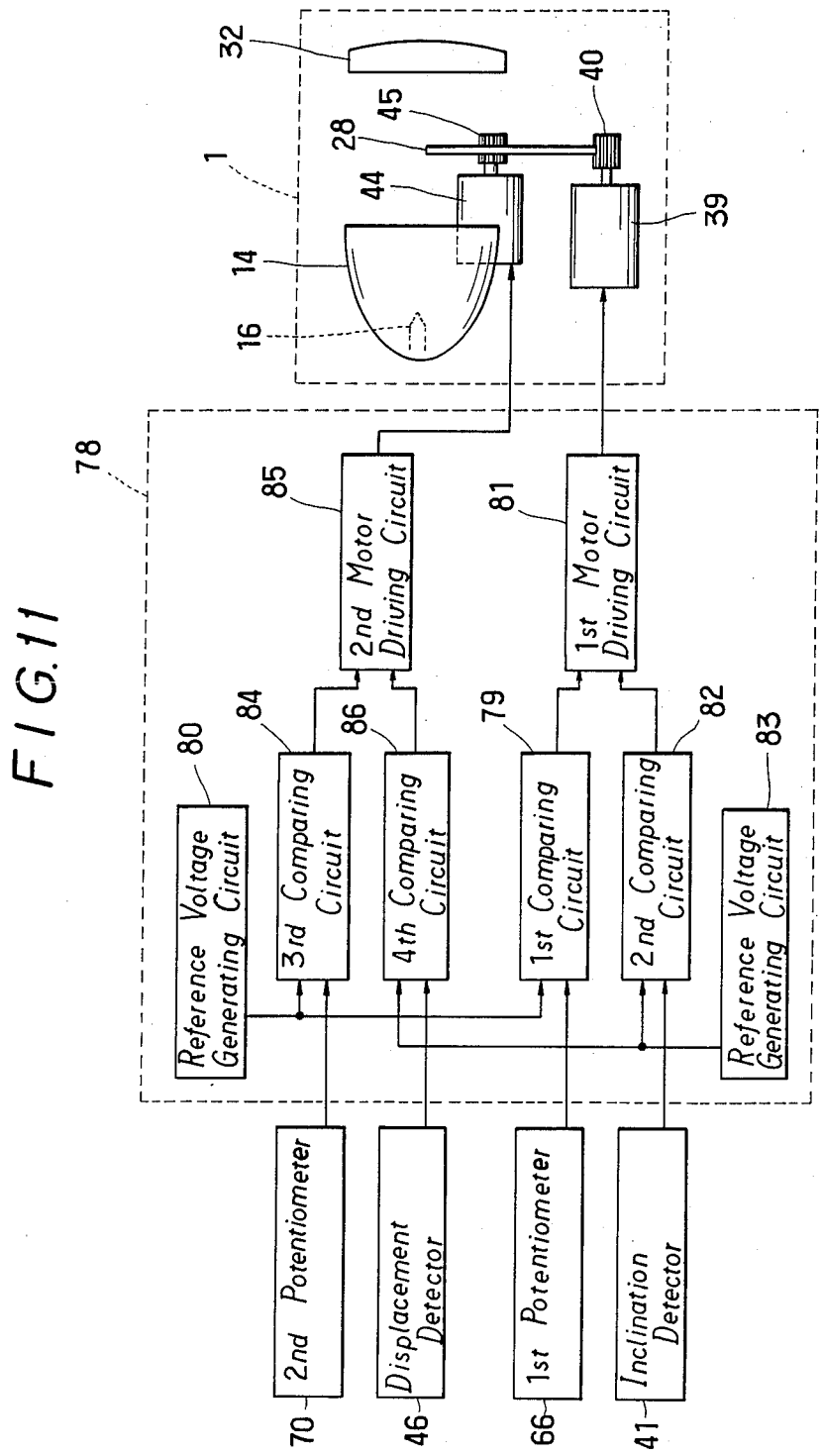
FIG. 11 is a block diagram of a control circuit.

A control circuit 78 will now be described with respect to FIG. 11.

A first comparing circuit 79 acts to compare the terminal voltage of the first potentiometer 66 or the signal indicating the inclination of the vehicle body in a transverse direction with a reference voltage received from a reference voltage generating circuit 80 or a voltage equal to the terminal voltage of the first potentiometer 66 when the vehicle body is not inclined, and when there is a difference therebetween, the circuit 79 generates a driving signal to a first motor driving circuit 81 for driving the first motor 39. The motor 39 is driven in the direction corresponding to the difference between the two signals. The douser plate 28 is inclined in the desired direction.

A second comparing circuit 62 acts to compare the terminal voltage of the inclination detector 4, or the signal indicating the inclination of the douser plate 28 in a transverse direction with a reference voltage received from a reference voltage generating circuit 83 or a voltage corresponding to a predetermined correction angle, and when these two signals take the same value, the circuit 82 generates a stopping signal to the first motor driving circuit 81 for stopping the first motor 39.

Thus, the douser plate 28 is inclined in the desired direction and by a desired amount by the rotation of the first motor 39 when the vehicle body inclines in a transverse direction.

A third comparing circuit 84 acts to compare the terminal voltage of the second potentiometer 70 or the signal indicating the inclination of the vehicle body in the longitudinal directions with a reference voltage received from the reference voltage generating circuit 80 or a voltage equal to the terminal voltage of the second potentiometer 70 when the vehicle body is not inclined in the longitudinal directions, and when there is a difference therebetween, the circuit 84 generates a driving signal to a second notor driving circuit 85 for driving the second motor 44. The motor 44 is driven in the direction corresponding to the difference between the two signals. The elevator member 21 together with the douser plate 28 is displaced upward or downward.

A fourth comparing circuit 86 acts to compare the terminal voltage of the displacement detector 46 or the signal indicating the displacement of the douser plate 28 in the vertical directions with a reference voltage received from the reference voltage generating circuit 83 or a voltage corresponding to a predetermined corrected position of the douser plate 28 in the vertical directions, and when these two signals take the same value, the circuit 86 generates a stopping signal to the second motor driving circuit 85 for stopping the second motor 44.

Thus, the douser plate 28 is displaced upward or downward and by a desired amount by the rotation of the second motor 44 when the vehicle body inclines in the longitudinal directions.

1. Beam Angle Adjustment [FIG. 7, FIG. 11, FIG. 12]

The beam angle or the light distribution of the headlight 1 is adjusted by the vehicle body inclination detector 48 and the control circuit 78 as follows.

When the vehicle body is not inclined both in the longitudinal and transverse directions, the terminal voltages of the potentiometers 66 and 70 of the vehicle body inclination detector 48 are equal to the reference voltage received from the reference voltage generating circuit 80 of the control circuit 80, thus, the first and the second motors 39 and 44 do not rotate.

When the vehicle body inclines leftward, the douser plate 28 inclines leftward as shown in two dotted chain lines in FIG. 12A and the light beam also inclines leftward as shown in FIG. 12A. When the vehicle body inclines rightward, the douser plate 28 inclines rightward as shown in two dotted chain lines in FIG. 12B and the light beam also inclines rightward as shown in FIG. 12B. In these cases, the outer gimbal 54 of the vehicle body inclination detector 48 inclines relative to the casing 49 in the leftward of rightward direction, then, the terminal voltage of the first potentiometer 66 changes from the reference voltage whereby a driving signal is supplied to the first motor driving circuit 81 from the first comparing circuit 79 for rotating the first motor 39. The douser plate 28 inclines in the directions shown by arrow directions of chain lines in FIGS. 12A and 12B respectively, and the inclining movement of the douser plate 28 is controlled by the rotation of the first motor 39.

When the vehicle body inclines in the front down direction, the douser plate 28 displaces downward as shown in two dotted chain lines in FIG. 12C and the light beam displaces downward as shown in FIG. 12C, and when the vehicle body inclines in the front up direction, the douser plate 28 displaces upward as shown in two dotted chain lines in FIG. 12D and the light beam displaces upward as shown in FIG. 12D. The outer gimbal 54 of the vehicle body inclination detector 48 inclines in the longitudinal directions, and the terminal voltage of the second potentiometer 70 changes from the reference voltage whereby a driving signal is supplied to the second motor driving circuit 85 from the third comparing circuit 84. The second motor 44 rotates and the douser plate 28 is, together with the elevator member 21, displaced downward as shown in chain lines in FIG. 12C or upward as shown in chain lines in FIG. 12D. When the douser plate has been displaced by a desired amount, the rotation of the second motor 44 terminates.

When the vehicle body inclines in both of longitudinal and transverse directions, the first and second motors 39 and 44 are rotated simultaneously, and inclination of the light beam in both of the longitudinal and transverse directions is adjusted simultaneously.

When the inclination of the vehicle is removed, the terminal voltage of the potentiometers 66 and 70 returns to the initial condition whereby the motors 39 and 44 are actuated to move the douser plate 28 to the initial position.

In the embodiment, the adjustment is performed such that the douser plate is moved by a predetermined amount responsive to the inclination of the vehicle body, however, the adjustment may be performed in plurality of steps, or the adjusting angle of the inclination in the transverse direction may be equal to the inclination angle of the vehicle body.

m. Modified Form of First Driving Portion [FIG. 13]

FIG. 13 shows a driving portion 38A as a modified form of the first driving portion 38.

A first motor 39A is supported on the tip end portion of the lower portion 27'b of the rear arm 27' of the elevator member 21 similar to the first motor 39. However, the rotor shaft 39a extenis in the transverse direction and has worm gear 87 secured thereon. The gear 87 engages with worm wheel teeth 29A formed on the lower surface of the douser plate 28.

G. Advantages of the Invention

As described heretofore, the headlight according to the invention comprises a douser plate located on the side of front opening of the reflective mirror so as to intercept a part of light emitted from the light source, means for supporting the douser plate to incline in either transverse direction relative to the lamp body, and driving means for inclining the douser plate thereby adjusting the transverse inclination of the light distribution.

Therefore, according to the invention, it is possible to change the direction of the light beam by inclining only the douser plate in the transverse direction without moving the reflective mirror, the light controlling lens and the like, whereby the number of movable parts is reduced to the minimum.

The construction of the headlight is simplified, the size and weight can be reduced, and driving force for moving the movable members is reduced.

Further, since the douser plate is made of a relatively small sized member, the adjusting movement is smooth, quick and accurate.

In the embodiment, the douser plate is also movable in the vertical directions, which enables to compensate the inclination of the vehicle body in the longitudinal and transverse directions.

In the embodiment, the headlight is used for a two wheeled vehicle such as a motor cycle, however the present invention may be applied to other uses.

What is claimed is:

1. A headlight for use in a vehicle and comprising a lamp body, a reflective mirror mounted in the lamp body and having a front opening, a bulb mounted in the reflective mirror and acting as the light source of the headlight, a douser plate mounted on the lamp body at the location between the front opening of the mirror and the bulb and intercepting a part of the light emitted from the bulb, means for supporting the douser plate on the lamp body such that the douser plate can incline transversely with respect to the lamp body, and driving means provided on the lamp body for transversely inclining the douser plate.

2. A headlight according to claim 1, further comprising means for detecting the inclination of the body of the vehicle, and means for actuating the driving means for transversely inclining the douser plate in response to the inclination of the vehicle.

3. A headlight according to claim 1, further comprising means for supporting the douser plate on the lamp body such that the douser plate can displace in the vertical directions with respect to the lamp body, and second driving means provided on the lamp body for displacing the douser plate in vertical directions.

4. A headlight according to claim 2, further comprising means for detecting the inclination of the body of the vehicle in longitudinal directions, and means for actuating the second driving means for displacing the douser plate in the vertical directions in response to the inclination of the vehicle in the longitudinal directions.

5. A headlight according to claim 2 wherein said means for detecting the inclination of the vehicle includes a rotor mounted on a gimbal device and driven by a motor, and means for detecting the inclination of the rotor with respect to the body of the vehicle.

6. A headlight according to claim 1, wherein the reflective mirror has the configuration generally of a paraboloid, the bulb is located generally on one of the focii of the paraboloid, and the douser plate is located near to the other focus of the paraboloid.

7. The headlight according to claim 3, further comprising means for detecting the inclination of the body of the vehicle in the longitudinal directions, and means for actuating the second driving means for displacing the douser plate in the vertical directions in response to the inclination of the vehicle in the longitudinal direction.

8. The headlight according to claim 4, wherein said means for detecting the inclination of the vehicle includes a rotor mounted on a gimbal device and driven by a motor, and means for detecting the inclination of the rotor with respect to the body of the vehicle.

* * * * *